US010278077B2

(12) United States Patent
Huque et al.

(10) Patent No.: US 10,278,077 B2
(45) Date of Patent: Apr. 30, 2019

(54) PROTECTION OF A SECURITY MODULE IN A TELECOMMUNICATION DEVICE COUPLED TO AN NFC CIRCUIT

(75) Inventors: Thierry Huque, Ramillies (BE); Olivier Van Nieuwenhuyze, Wezembeek-Oppem (BE)

(73) Assignee: Proton World International N.V., Diegen (BE)

( * ) Notice: Subject to any disclaimer, the term of this patent is extended or adjusted under 35 U.S.C. 154(b) by 529 days.

(21) Appl. No.: 13/583,157

(22) PCT Filed: Feb. 28, 2011

(86) PCT No.: PCT/EP2011/052930

§ 371 (c)(1),
(2), (4) Date: Nov. 19, 2012

(87) PCT Pub. No.: WO2011/120745

PCT Pub. Date: Oct. 6, 2011

(65) Prior Publication Data

US 2013/0059568 A1 Mar. 7, 2013

(30) Foreign Application Priority Data

Mar. 9, 2010 (FR) ...................................... 10 51696

(51) Int. Cl.
*H04W 12/10* (2009.01)
*H04W 12/12* (2009.01)
(Continued)

(52) U.S. Cl.
CPC ......... *H04W 12/10* (2013.01); *H04L 63/0492* (2013.01); *H04W 12/12* (2013.01); *H04W 4/80* (2018.02)

(58) Field of Classification Search
CPC ... H04L 9/0869; H04L 63/10; H04L 41/0213; H04L 12/56; H04L 63/0492; H04L 63/08; H04W 12/10; H04W 12/12; H04W 4/008
See application file for complete search history.

(56) References Cited

U.S. PATENT DOCUMENTS 6,070,243 A 5/2000 See et al.
6,092,191 A 7/2000 Shimbo et al.
(Continued)

FOREIGN PATENT DOCUMENTS

CN 1596018 A 3/2005
CN 1933351 A 3/2007
(Continued)

OTHER PUBLICATIONS

English translation of the Written Opinion of the International Searching Authority dated Mar. 9, 2010 from corresponding International Application No. PCT/EP2011/052930.
(Continued)

*Primary Examiner* — George Eng
*Assistant Examiner* — Hung K Du
(74) *Attorney, Agent, or Firm* — Seed IP Law Group LLP

(57) ABSTRACT

The invention relates to a method for protecting information contained in a security module of a telecommunication device provided with a near-field communication router, wherein the provision of information from the security module to the near-field communication router is subject to checking a signature of a routing table between ports of said router.

17 Claims, 4 Drawing Sheets

(51) Int. Cl.

| | |
|---|---|
| ***H04L 29/06*** | (2006.01) |
| ***H04W 4/80*** | (2018.01) |

(56) References Cited

U.S. PATENT DOCUMENTS

| | | | | |
|---|---|---|---|---|
| 6,674,769 | B1 * | 1/2004 | Viswanath | H04L 45/742 370/469 |
| 7,974,536 | B2 | 7/2011 | Yu et al. | |
| 2004/0023220 | A1 | 2/2004 | Greenfield et al. | |
| 2004/0065735 | A1 | 4/2004 | Christoffers et al. | |
| 2004/0177158 | A1 | 9/2004 | Bauch et al. | |
| 2004/0232220 | A1 | 11/2004 | Beenau et al. | |
| 2005/0013310 | A1 * | 1/2005 | Banker et al. | 370/401 |
| 2006/0031933 | A1 | 2/2006 | Costa et al. | |
| 2006/0213972 | A1 | 9/2006 | Kelley et al. | |
| 2007/0006314 | A1 | 1/2007 | Costa et al. | |
| 2007/0186097 | A1 * | 8/2007 | Arditti | H04L 63/0823 713/156 |
| 2007/0263596 | A1 | 11/2007 | Charrat | |
| 2008/0085001 | A1 | 4/2008 | Charrat et al. | |
| 2008/0219444 | A1 * | 9/2008 | Benteo et al. | 380/255 |
| 2008/0296978 | A1 | 12/2008 | Finkenzeller et al. | |
| 2009/0106824 | A1 | 4/2009 | Morel et al. | |
| 2009/0206984 | A1 * | 8/2009 | Charrat et al. | 340/5.2 |
| 2010/0084465 | A1 | 4/2010 | Jolivet | |
| 2010/0090805 | A1 | 4/2010 | Libotte | |
| 2010/0137025 | A1 | 6/2010 | Tal et al. | |
| 2010/0161403 | A1 | 6/2010 | Fisher et al. | |
| 2010/0178867 | A1 | 7/2010 | Charrat | |
| 2010/0178868 | A1 | 7/2010 | Charrat | |
| 2010/0210300 | A1 | 8/2010 | Rizzo et al. | |
| 2010/0227553 | A1 | 9/2010 | Charrat et al. | |
| 2010/0245054 | A1 | 9/2010 | Kim | |
| 2010/0259216 | A1 | 10/2010 | Capomaggio | |
| 2010/0274677 | A1 * | 10/2010 | Florek | G06Q 20/10 705/16 |
| 2010/0325300 | A1 | 12/2010 | Vasters et al. | |
| 2011/0065398 | A1 | 3/2011 | Liu et al. | |
| 2011/0226853 | A1 | 9/2011 | Soh et al. | |
| 2011/0237190 | A1 | 9/2011 | Jolivet | |
| 2011/0269423 | A1 | 11/2011 | Schell et al. | |
| 2011/0320825 | A1 | 12/2011 | Greiner et al. | |
| 2012/0052801 | A1 | 3/2012 | Kulkarni | |
| 2012/0190299 | A1 | 7/2012 | Takatsuka et al. | |
| 2012/0190332 | A1 | 7/2012 | Charles | |
| 2013/0057640 | A1 | 3/2013 | Callahan | |
| 2013/0059563 | A1 | 3/2013 | Huque et al. | |
| 2013/0059566 | A1 | 3/2013 | Huque et al. | |
| 2013/0059567 | A1 | 3/2013 | Huque et al. | |
| 2013/0217325 | A1 | 8/2013 | Ingels | |
| 2013/0225125 | A1 | 8/2013 | Hugue et al. | |
| 2013/0337770 | A1 | 12/2013 | Huque et al. | |
| 2014/0041036 | A1 | 2/2014 | Haque et al. | |
| 2014/0201815 | A1 | 7/2014 | Van Nieuwenhuyze et al. | |
| 2014/0289833 | A1 | 9/2014 | Briceno et al. | |

FOREIGN PATENT DOCUMENTS

| | | | |
|---|---|---|---|
| CN | 101079013 | | 11/2007 |
| CN | 101202621 | | 6/2008 |
| CN | 101491052 | A | 7/2009 |
| CN | 101536008 | A | 9/2009 |
| EP | 1 909 431 | A1 | 4/2008 |
| EP | 1 928 099 | | 6/2008 |
| EP | 2 034 705 | A1 | 3/2009 |
| EP | 2 219 353 | A1 | 8/2010 |
| FR | 2903549 | A1 | 1/2008 |
| FR | 2 921 786 | A1 | 4/2009 |
| WO | 2007/068993 | A1 | 6/2007 |
| WO | WO 2007093580 | A1 | 8/2007 |
| WO | WO 2009115997 | A2 | 9/2009 |
| WO | 2009/147094 | A1 | 12/2009 |

OTHER PUBLICATIONS

English translation of the Written Opinion of the International Searching Authority dated Mar. 9, 2010 from related International Application No. PCT/EP2011/052899.

English translation of the Written Opinion of the International Searching Authority dated Mar. 9, 2010 from related International Application No. PCT/EP2011/052902.

English translation of the Written Opinion of the International Searching Authority dated Mar. 9, 2010 from related International Application No. PCT/EP2011/052907.

U.S. Appl. No. 13/583,127, filed Sep. 6, 2012, Huque et al.

U.S. Appl. No. 13/583,166, filed Sep. 6, 2012, Huque et al.

U.S. Appl. No. 13/583,148, filed Sep. 6, 2012, Huque et al.

French Search Report and Written Opinion dated Oct. 4, 2010 from corresponding French Application No. 10/51695.

International Search Report dated May 19, 2011 from corresponding International Application No. PCT/EP2011/052907.

French Search Report and Written Opinion dated Oct. 14, 2010 from related French Application No. 10/51693.

International Search Report dated Apr. 6, 2011 from related International Application No. PCT/EP2011/052899.

French Search Report and Written Opinion dated Oct. 19, 2010 from related French Application No. 10/51694.

International Search Report dated Apr. 19, 2011from related International Application No. PCT/EP2011/052902.

French Search Report and Written Opinion dated Oct. 1, 2010 from related French Application No. 10/51696.

International Search Report dated Jun. 8, 2011from related International Application No. PCT/EP2011/052930.

*Smart Cards; UICC—Contactless Front-end* (*CLF*) *Interface; Host Interface* (*HCI*) (*Release 7*); *ETSI TS 102 622*, ETSI Standard, European Telecommunications Standards Institute (ETSI), Sophia Antipolis Cedex, France, vol. SCP-T, No. V7.4.0, Apr. 1, 2009 (Apr. 1, 2009), XP014043836.

Marc Pasquet et al: *Payment with mobile NFC phones. How to analyze the security problems*, International Symposium on Collaborative Technologies and Systems (CTS 2008), 1 •Wirier 2008 (Feb. 1, 2008), pp. 1-8, XP007913609.

*Smart Cards; UICC—Contactless Front-end* (*CLF*) *Interface; Host Controller Interface* (*HCI*) (*Release7*);, Technical Specification, European Telecommunications Standards Institute (ETSI) 650, Route Des Lucioles; F-06921 Sophia Antipolis; France, No. V7.5.0, Jun. 1, 2009 (Jun. 1, 2009), XP014044484.

ETSI, "Intelligent Transport Systems (ITS); Access layer specification for Intelligent Transport Systems using LTE Vehicle to everything communication in the 5,9 GHz frequency band," Technical Specification 103 613, V1.1.1, Nov. 2018, 18 pages.

ETSI, "Smart Cards; UICC—Contactless Front-end (CLF) Interface; Part 1: Physical and data link layer characteristics (Release 7)," Technical Specification 102 613, V7.3.0, Sep. 2008, 57 pages.

Haselsteiner et al., "Security in Near Field Communication (NFC)," *Workshop on RFID Security*, 2006, 11 pages.

ISO/IEC, "Identification cards—Integrated circuit cards—Part 4: Organization, security and commands for interchange," International Standard 7816-4, 2$^{nd}$ ed., Jan. 15, 2005, 90 pages.

ISO/IEC, "Identification cards—Integrated circuit cards—Part 3: Cards with contacts—Electrical interface and transmission protocols," International Standard 7816-3, 3$^{rd}$ ed., Nov. 1, 2006, 58 pages.

Mulliner, "Attacking NFC Mobile Phones," *EUSecWest Conference*, London, United Kingdom, May 2008, 71 pages.

Mulliner, "Vulnerability Analysis and Attacks on NFC-enabled Mobile Phones," *International Conference on Availability, Reliability and Security*, 2009, 6 pages.

Smart Card Alliance, "Security of Proximity Mobile Payments," CPMC-09001, May 2009, 40 pages.

Van Damme et al., "Practical Experiences with NFC Security on mobile Phones," *Workshop on RFID Security*, 2009, 37 pages.

(56) References Cited

OTHER PUBLICATIONS

ETSI TS 102 622, "Smart Cards; UICC—Contactless Front-end (CLF) Interface; Host Controller Interface (HCI) (Release 10)," V10.2.0, Technical Specification, Mar. 2011, 56 pages.
ETSI TS 102 695-2, "Smart Cards; Test specification for the Host Controller Interface (HCI); Part 2: UICC features (Release 7)," V7.2.0, Technical Specification, Oct. 2010, 62 pages.
Francis et al., "Potential Misuse of NFC Enabled Mobile Phones with Embedded Security Elements as Contactless Attack Platforms," The Institute of Electrical and Electronics Engineers, Inc., 2009, 8 pages.
French Search Report, dated May 4, 2011, for French Application No. 1060819, 6 pages.
International Search Report, dated Jun. 6, 2012, for International Application No. PCT/EP2012/055312, 2 pages.
International Search Report, dated Mar. 23, 2012, for International Application No. PCT/FR2011/053023, 4 pages.
International Search Report, dated Jul. 12, 2012, for International Application No. PCT/FR2012/050762, 3 pages.
International Search Report and Written Opinion, dated Nov. 28, 2011, for International Application No. PCT/EP2011/064639, 14 pages.
International Search Report and Written Opinion, dated Jan. 25, 2012, for International Application No. PCT/EP2011/064643, 25 pages.
Madlmayr et al., "Management of Multiple Cards in NFC-Devices," LNCS 5189, CARDIS 2008, pp. 149-161. (14 pages).
Madlmayr et al., "NFC Devices: Security and Privacy," The Third International Conference on Availability, Reliability and Security, pp. 642-647, 2008. (6 pages).
Rieback et al., "Keep on Blocking' in the Free World: Personal Access Control for Low-Cost RFID Tags," LNCS 4631, Security Protocols 2005, pp. 51-59. (10 pages).
Written Opinion, dated Jun. 6, 2012, for International Application No. PCT/EP2012/055312, 8 pages.
Written Opinion, dated Mar. 23, 2012, for International Application No. PCT/FR2011/053023, 6 pages.
Written Opinion, dated Jul. 12, 2012, for International Application No. PCT/FR2012/050762, 5 pages.

* cited by examiner

| PIPEID | GATEID | GATEID |
|---|---|---|
| B0 B1 B2 B3 B4 B5 B6 B7 | | |
| X 0 0 0 0 1 X X | | 11 |
| X 0 0 0 1 0 X X | | 12 |
| X 0 0 0 1 1 X X | | 13 |
| X 0 0 1 0 0 X X | | 21 |
| X 0 0 1 0 1 X X | | 22 |
| X 1 0 1 1 1 X X | | 23 |

} RFGATEID

PROTECTION OF A SECURITY MODULE IN A TELECOMMUNICATION DEVICE COUPLED TO AN NFC CIRCUIT

CROSS REFERENCE TO RELATED APPLICATIONS

This application is a U.S. National Stage patent application based on International patent application number PCT/EP2011/052930, filed on Feb. 28, 2011, which application claims the priority benefit of French patent application number 10/51696, filed on Mar. 9, 2010, which applications are hereby incorporated by reference to the maximum extent allowable by law.

BACKGROUND

Technical Field

The present disclosure generally relates to transactions performed by means of mobile telecommunication devices of cell phone type. The present disclosure more specifically applies to such devices further equipped with a near field communication circuit (NFC).

Discussion of the Related Art

Cell phones are more and more often equipped with a near field communication interface which enables them to combine electromagnetic transponder functions with mobile telephony functions. In particular, this adds functions of emulation of an electromagnetic transponder, of contactless or contactless card reader type to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called an NFC router. This router is equipped with a radio frequency (RF) transceiver front-head associated with a low-range antenna to communicate as an electromagnetic transponder. The router uses the capacities of the processor(s) of the mobile device for data processing and storage operations. For applications of access control, electronic purse, payment, etc., a secure element enabling to authenticate the user is used. This secure element is either integrated with the mobile telecommunication device (dedicated integrated circuit, circuit soldered to the printed circuit board) or contained in a microcircuit supported by a subscriber identification module (SIM), or any other removable card, for example at the standard format of a memory card.

An NFC router may also be present in a mobile device of USB key type, in a bank teller terminal, in an adhesive device (sticker), etc.

An emulation of a contactless card in a mobile telecommunication device is capable of generating weak points in terms of transaction security.

It would be desirable to be able to detect such weak points.

It would further be desirable to avoid such weak points to secure transactions.

SUMMARY

According to a first aspect, an embodiment detects a piracy attempt on a telecommunication device associated with a near field communication module.

According to another aspect, an embodiment overcomes all or part of the disadvantages of mobile telecommunication devices associated with a near field transmission module.

According to still another aspect, an embodiment improves the security against a piracy attempt on a security module of subscriber identification module type, contained in a telecommunication device associated with a near field transmission module.

An embodiment provides a method for protecting data contained in a security module of a telecommunication device equipped with a near field communication router, wherein provision of data from the security module to the near field communication router is dependent on verification of a signature of a routing table between gates of said router.

According to an embodiment, a reference signature is calculated on each modification of the routing table and is stored in the security module.

According to an embodiment, the reference signature is calculated by the security module.

According to an embodiment, the reference signature is calculated by the router.

According to an embodiment, the signature of the routing table is verified by the security module on each initialization of the router.

According to an embodiment, a provision of data by said security module on a gate of said router is preceded by a comparison of a current signature of the routing table with the reference signature.

According to an embodiment, an update of the routing table is dependent on a verification of an authentication code keyed in by a user.

An embodiment also provides a security module intended for a telecommunication device equipped with a near field communication router, comprising means capable of implementing the protection method.

An embodiment also provides a telecommunication device equipped with a near field communication router, comprising means for implementing the protection method.

BRIEF DESCRIPTION OF THE DRAWINGS

The foregoing and other objects, features, and advantages of the embodiments will be discussed in detail in the following non-limiting description of specific embodiments in connection with the accompanying drawings.

DETAILED DESCRIPTION

Figure 1:
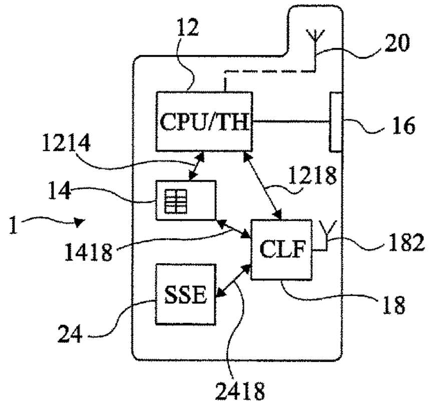
FIG. 1 schematically shows a mobile telecommunication device of the type to which the present disclosure applies as an example.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, the embodiments being compatible with usual protocols. Further, the circuits forming the mobile communication device have not been detailed either, the embodiments being here again compatible with usual programmable devices.

FIG. 1 very schematically shows a mobile telecommunication device (for example, a cell phone) of the type to which the present disclosure applies as an example. The different elements of interface with the user (keyboard, display, speaker, etc.) have not been shown, since these elements are not modified by the implementation of the embodiments which will be described.

Device 1 comprises a central processing unit 12 (CPU/TH) formed of at least one microprocessor forming the device core. This microprocessor is currently called terminal host. For the telecommunication operation over a network (GSM, 3G, UMTS, etc.), this microprocessor uses identification and authentication data provided by a subscriber identification module 14 (SIM), forming a security module of the device. Microprocessor 12 is capable of using one or several internal memories, not shown, of the telephone. Telephone 1 may also comprise a memory card reader 16 or other buses of communication with the outside to load data and/or applications into the telephone.

The mobile devices to which the described embodiments apply combine the telecommunication function with that of a near field contactless transmission system (NFC). For this purpose, device 1 comprises a circuit 18 (CLF—contactless front-end) forming a near field communication module, like an electromagnetic transponder. Module 18 is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). Module 18 is also called an NFC router.

The different elements of device 1 communicate according to various protocols. For example, circuits 12 and 18 communicate over a link 1218 of I2C or SPI type, SIM card 14 communicates with microprocessor 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

The embodiments will be described in relation with a GSM telephone. The present disclosure however more generally applies to any telecommunication device adapted to a mobile network (for example, Wifi, Bluetooth, WiMax, etc.) and associated with a contactless transmission module (NFC router), for example, a USB key, a bank terminal, a power consumption meter, or other), an access or transport ticket validation terminal, etc.

Similarly, the near field communication module will be called a router since it generally integrates all the functions useful to the emulation of a contactless card within a same circuit, but the described embodiments apply to any NFC-type module.

Router 18 comprises physical terminals of connection to links 1218, 1418, and 2418 and manages logic gates for assigning these terminals to the different functions associated with near field communications. Router 18 thus comprises a processor and volatile and non-volatile memories for storing, among others, a routing table for the different logic gates. Some gates are reserved for router administration functions while others can be freely assigned by the router.

In operation, router 18 makes available and manages different pipes of communication with the other circuits 12, 14, 24, etc. of the mobile device to provide these circuits access to the near field communication functions, that is, to gates connected to radio frequency transmission circuits, called RF gates.

Figure 2:
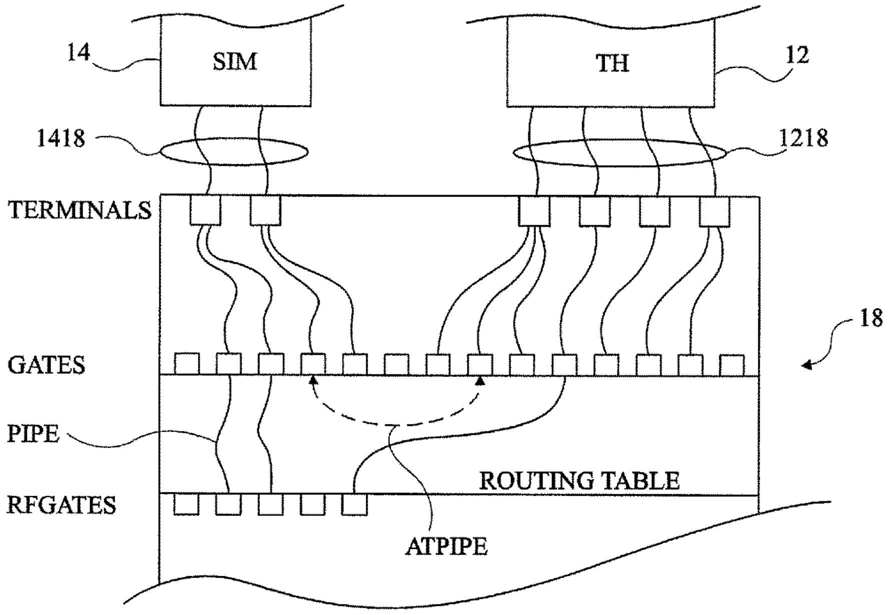
FIG. 2 is a diagram illustrating a function of a near field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to the same circuit (which is symbolized in FIG. 2 by the connection of a same terminal to several gates). The routing table of router 18 assigns some gates to internal functions (for example, configuration and administration functions), but also creates pipes (PIPE) between some gates assigned to the SIM card or to the RF microcontroller, and gates (RF GATES) comprised in module 18. This corresponds to the creation of pipes between the circuits external to router 18 and its RE transmission circuits for the implementation of the different applications requiring a near field communication. For example, in bank, transport, electronic purse, access applications, etc. which require a secure identification or authentication of the user, one or several pipes are created between the router and the SIM card to use the secure user identification data and validate the transaction.

The integration of NFC routers in mobile telecommunication devices and the sharing of a same security module (SIM card) generate weak points in terms of security.

Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible piracy attempts.

Up to now, the main concern has been to guarantee that a near field transaction emulated by the mobile device would not enable a pirate device intercepting the near field communication to use data provided by the security module.

However, there remains a risk since router 18 also manages a pipe (ATPIPE symbolized in FIG. 2) of communication between SIM card 14 or any other security module, and microcontroller 12 of the mobile telecommunication device. This pipe is normally used so that SIM card 14 informs microcontroller 12 that a message reaches it over the NFC link. It is, however, also possible to divert this use to make security module 14 believe that it communicates with the router for a near field transaction and thus over a pipe with the RF gates of the telephone, while it is actually communicating with microcontroller 12.

Figure 3:
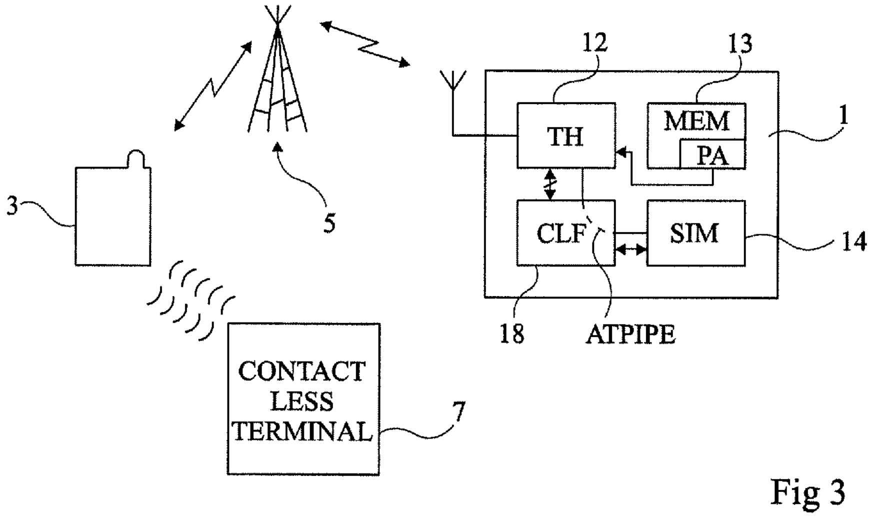
FIG. 3 very schematically illustrates an attack capable of exploiting a weakness of the telecommunication device of FIG. 1.

FIG. 3 very schematically illustrates, in the form of blocks, the possible use of a pipe ATPIPE between a SIM card 14 and a microcontroller 12 of a cell phone 1.

It is assumed that, in a preparatory phase of the attack, GSM phone 1 has been pirated and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (MEM) of phone 1 and that this application may provide instructions to microcontroller 12. Several embodiments of the preparatory phase will be discussed subsequently. The user of device 1, once it has been hacked by the loading of application PA and by the creation of a pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or another dedicated security module) of this telephone to authenticate the user and validate the payment.

In the mechanism of FIG. 3, at the payment validation, telephone 3 uses the GSM network to ask telephone 1 to validate the payment by means of its subscriber identification module. For example, device 3 sends an SMS over network 5 which, when received by telephone 1, is processed by the pirate application. Said application simulates requests from the RF gates and transmits them over pipe ATPIPE, so that identification module 14 responds and validates the transaction. This validation is diverted by microcontroller 12 and is sent back to device 3 which, in turn, transmits it to its NFC router to validate the payment for terminal 7. As a result, the payment is debited to the subscriber of telephone 1 and not to the attacker owning device 3. Most often, a contactless application requires no interaction with the terminal (7, FIG. 3) except for a presentation of a contactless device. In particular, no PIN keying is required for a near field communication to avoid lengthening the transactions, so that device 3 may easily pirate distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without pirate device 3 using its own NFC router, for example, using a contactless communication mode, provided that the requested authentication originates from a security module and respects the formats and protocols used by the NFC protocol. Further, such an attack may be used to divert any data from device 1 for a pirate system (for example, data duplicating the content of the magnetic track of a card in a bank payment application).

Further, the attack may involve the SIM card of cell phone 1 or of any other security module (for example, module 24), provided that a pipe is managed by router 18 between this module and a circuit (generally, microcontroller 12) capable of managing communications over network 5.

This attack on near field transactions, using the telecommunication network, is due to the presence of a communication pipe, via the NFC router, between a security module and a microcontroller connected to this router.

Implementing the attack requires a preparatory phase in which an intervention of the telephone 1 which is desired to be pirated is necessary. This preparation requires an intervention depending on the security level provided by the SIM card to the management of the NFC communication pipes.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card.

According to another embodiment, security module 14 is more advanced and checks the association between the numbers of the pipes or of its own gates and the RF gates.

In a first case, it is considered that SIM card 14 does not take into account the circuit with which the gate is created (and thus, the fact that it may be a gate intended for the microcontroller). This embodiment uses the fact that the assignment of the pipe numbers (identifiers) is often sequential. It is first started by asking the microcontroller to eliminate a pipe between the SIM card and the RF gates. Then, a pipe having the same identifier is created between the microcontroller and the SIM card.

Figure 4:
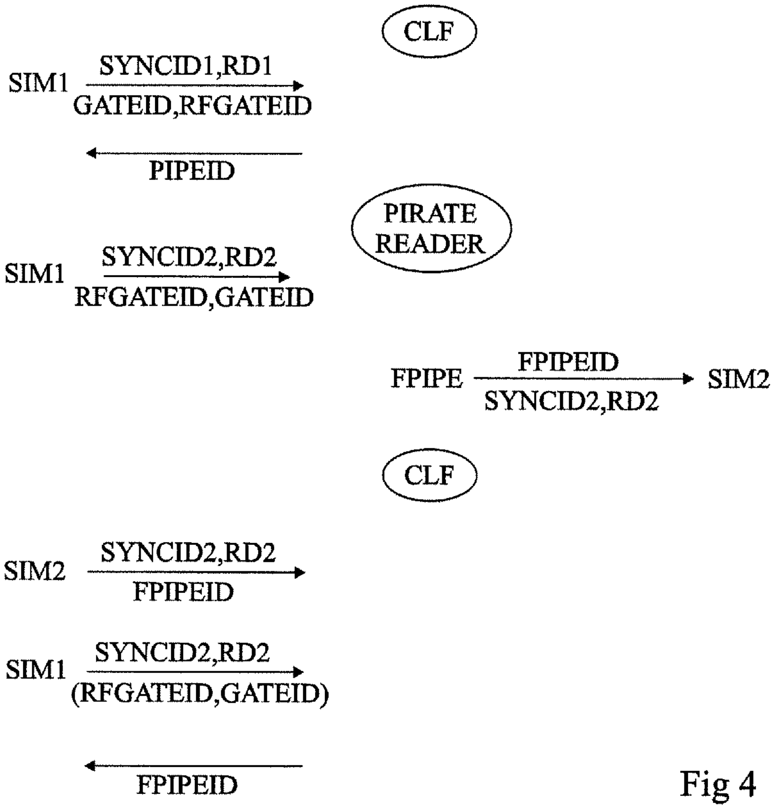
FIG. 4 illustrates an embodiment of a preparatory phase of such an attack.

FIG. 4 illustrates another embodiment of a preparatory phase of the attack aiming at diverting a pipe between router 18 (CLF) and the SIM card (SIM1) of a user. This embodiment is more specifically intended for systems in which the SIM card makes sure, before transmitting data to the CLF router, that it has effectively controlled the creating of the communication pipe therewith.

The fact that, prior to the initialization of device 1, the SIM card checks whether it has already been in the presence of router 18 is exploited herein. If not, it reconfigures the pipes between its gates and the NFC router.

In a normal operation, at the first connection of card SIM1 in telephone 1, the card causes the creating, at the level of the so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 in a pirate device (PIRATE READER), for example, another cell phone having a microcontroller capable of executing a piracy program complying with the described functions, or a computer provided with a card reader and simulating a router. Since card SIM1 has never met the NFC router of the pirate device or emulated by said device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microprocessor instead of associating gate GATEID to an RF gate. Identifier FPIPEID and identifiers SYNCID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFGATEID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, a phase of observation of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYNCID2, the card considers that it "knows" the router and does not recreate pipes therewith. When card SIM1 requests a communication towards gate RFGATEID, the router uses the assigned pipe FPIPEID.

The GSM terminal has effectively been pirated, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There are various possibilities, depending on device 1. For example, the routing table may be read from. If this is not possible, it is possible, during the passing of card SIM1 in the pirate reader, to emulate an operation of the CLF circuit, in order to obtain the full configuration stored in this card. A pirate card SIM2 or a card emulator may also be used to extract the data from the routing table in valid phone 1.

It can thus be seen that it is possible to parameterize the diverting of a communication pipe between a security module and an NFC router to establish a pipe between this module and the telephone microprocessor, external to the NFC router.

So that the user of telephone 1 does not notice the piracy, even when he uses his contactless mode, the pirate application should comprise the function of redirecting pipe FPIPE towards the RF circuits of the router when a data request towards the SIM is transmitted by router 18.

Figure 5:
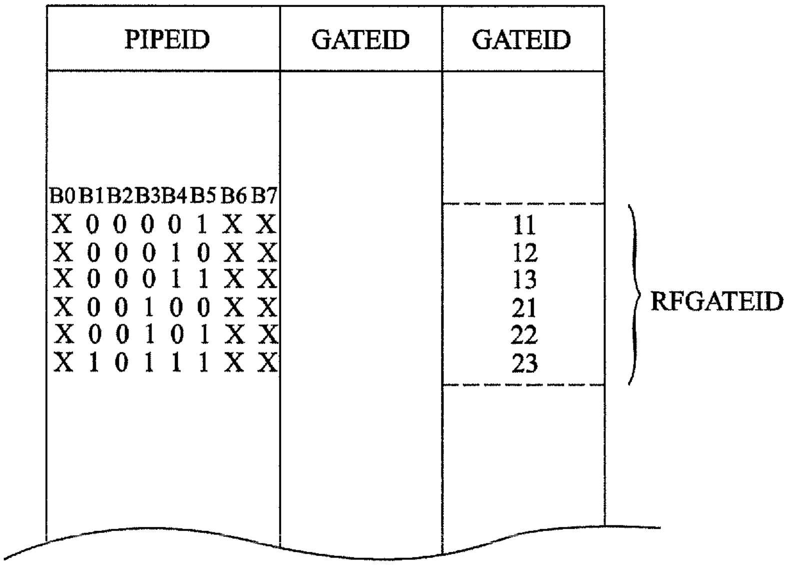
FIG. 5 illustrates an embodiment of a method of protection against such an attack.

FIG. 5 shows an example of a routing table of a router 18 according to an embodiment of a method for protecting a communication device against attacks such as described hereabove.

This drawing illustrates an example of recordings of a routing table of router 18. Usually, the table puts a pipe identifier PIPEID in correspondence with two gate identifiers GATEID between which the pipe is created. It is desired to make sure that the radio frequency interface gates RFGATEID are not diverted.

According to this embodiment, each pipe identifier depends on the gate identifier. For example, each identifier comprises a first set portion (in FIG. 5, from left to right and with notation B0 to B7, bits B1 to B5), which identifies the gate of the RF interface and a second portion "xx" (for example, bits B6 and B7) dynamically assigned during the generation. In this example, it is considered that first bit B0 is not used.

Thus, the SIM card can always check whether the pipe identification bits comprise the identification bits of one of the gates of the RF interface. This identifier is set for a given router.

To implement this embodiment, the security module should know the pipe identifier creation rule, to be able to determine the identifier of the gate with which the pipe will be created.

A combination function more complex than a mere bit juxtaposition may be provided, provided that this function is injective. A simpler function where pipe identifier PIPEID corresponds to RF gate identifier RFGATEID may conversely be provided.

Further, all the router gates are not necessarily taken into account. At least the RF interface gates should, however, be protected.

In case of an attack, either the pirate device does not respect the generation rule and identifier FPIPEID assigned by the router is not operative, or he knows and respects the generation function and the pipe will then not be diverted.

The identifiers may vary from one router to another (for example, by associating a number depending on the circuit identification or series number). In this case, the gate identifiers will have to be communicated to any SIM card introduced into the telephone.

According to another embodiment derived from the first one, the verification is performed by the microcontroller and not by the security module. An advantage then is that the protection is compatible with existing SIM cards. However, the verification program in the microcontroller should be protected to avoid being circumvented by a pirate application.

Figure 6:
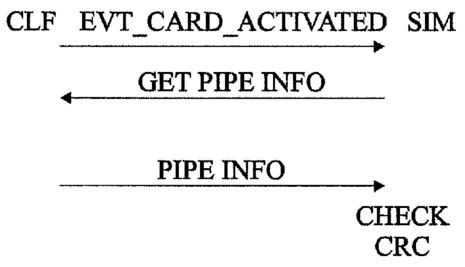
FIG. 6 illustrates another embodiment of a method of protection against the attack illustrated in FIG. 3.
Figure 7:
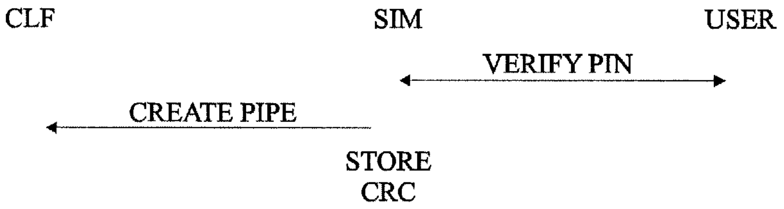
FIG. 7 illustrates a variation of the embodiment of FIG. 6.

FIGS. 6 and 7 illustrate another embodiment aiming at protecting a telecommunication device equipped with an NFC router. FIG. 6 illustrates the exchanges between the router and the SIM card so that the card accepts to transmit data to the router. FIG. 7 illustrates the exchanges between the router and the SIM card for the creation of pipes.

According to this embodiment, the PIN code of the user (FIG. 7) associated with the security module is verified (VERIFY PIN) for each modification of the routing table. Accordingly, the preparatory phase of the attack (for example, that discussed in relation with FIG. 4) is not possible since the user is not present to key in his PIN code on generation of the diverted pipe identifier. In the example of FIG. 7, the pipe creation request (CREATE PIPE) is transmitted by the SIM card to router 1 by sending identifiers GATEID and RFGATEID.

In a simplified embodiment, only this validation of a modification of the routing table (or an authorization to modify this table) by a capture of the PIN code is implemented.

Preferably, a signature (for example, a CRC code) at least taking into account identifier RFGATEID and the identifier of the addressee, generally designated as DestHostId, is used.

As illustrated in FIG. 6, for each data request, generally designated as EVT_CARD_ACTIVATED, from the CLF router to the SIM card, said card asks the router (GET PIPE INFO) to provide it with data about the pipe (in particular, the related gate identifiers PIPE INFO). It then calculates a current value of the signature to compare it (CHECK CRC) with the reference code that it contains. The card only provides the data (and thus validates the transaction) if the CRC code is valid. Accordingly, if the routing table has been modified by a pirate device, the signature will be different and the card will be able to notice it. As a variation, the current signature is calculated by the router and transmitted to the SIM card for verification.

In a simplified embodiment, if the time assigned to the verification enables it, a reading of the routing table by the SIM card and a direct comparison of a recording of this table that it contains may be provided.

According to another variation, the security module only verifies the signature of the routing table to authorize the provision of data. This variation is, however, less secure since it does not come along with the capture of an authentication code of the user.

The reference signature is preferably calculated and stored by the SIM card (FIG. 7, STORE CRC) at the time when a pipe creation is requested, based on the identifiers that it transmits to the router and on the pipe identifier that said router returns thereto. As a variation, the reference signature is calculated by the router during the modification and is provided to the SIM card for storage. An advantage of a calculation by the SIM card is that the implementation of the countermeasure then requires no modification of the router. It is sufficient to modify the SIM card program so that it not only requests the PIN code before causing a pipe creation, but also makes the sending of data dependent on a signature verification.

According to an alternative embodiment, the verification mechanism is not implemented for each data exchange request between the SIM card and the NFC router, but only at the initialization or booting of the mobile device.

It should be noted that most of the devices equipped with an NFC router should have the ability to operate even when they are off, that is, by being remote-supplied by a read terminal containing them in its field. This is not a weak point in above-advocated solutions. Indeed, when device 1 is off, its microcontroller is also off. There thus is no risk to have a pirate communication over the GSM network to validate a distance purchase.

It is possible to detect that a mobile communication device and more specifically its SIM card or its NFC router are vulnerable to the above-described attack by implementing it According to another aspect, it is provided to modify the router and the security module so that they detect a pipe diversion attack such as described hereabove.

For example, the microcontroller monitors the activity of the peripherals connected to the router to detect a sending from the microcontroller to the CLF router which would immediately precede a data request towards the SIM.

According to another example, on each reception of an RF message (from the NFC router), the SIM card verifies the routing by polling the router. Such an embodiment requires a modification of the router to add to it a function or instruction causing the sending of data relative to the routing (detail of the gates associated with a pipe). It may also be provided to have the router calculate a signature (for example, a CRC code) of each pipe/gate association (of their identifiers) to enable the SIM card to verify them.

The detection of an attack attempt may be followed by any adapted countermeasure. For example, a sound and/or visual alert is transmitted to the user. According to another example, the detection of an attack causes a reset of the telecommunication device or of the router. According to still another example, the provision of data by the SIM card is stopped.

It is further possible to verify that one of the embodiments of the countermeasure has been implemented by attempting one of the attacks, preferably the most elaborate attack (FIG. 4) and by watching whether it fails or succeeds.

Different embodiments have been described. Different alterations, modifications, and improvements will occur to those skilled in the art. In particular, the routing table signature mechanism may be associated with a mechanism of authentication of the exchanges between the SIM card and the NFC router.

Finally, the practical implementation of the embodiments, be it by hardware or software means, is within the abilities of those skilled in the art based on the functional indications given hereabove. Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising:

protecting data stored in a security module of a telecommunication device having a near field communication (NFC) router, the NFC router having a plurality of individually assignable gates and a routing table, the protecting including the acts of:

in response to receiving a request to assign a communication pipe to one of the individually assignable gates, creating and storing a reference signature for the communication pipe based on at least one of a personal code of an authorized user of the telecommunication device or an identifier of a radio frequency gate of the router;

in response to receiving a request to provide data from the security module to the NFC router, creating a current signature corresponding to the request to provide data;

verifying whether the current signature corresponds to the stored reference signature; and preventing a provision of the requested data from the security module based on a failure to verify that the current signature corresponds to the stored reference signature.

2. The method of claim 1, wherein creating and storing the reference signature for the communication pipe is based on the personal code of an authorized user of the telecommunication device.

3. The method of claim 1, wherein the reference signature is calculated by the security module.

4. The method of claim 1, wherein the reference signature is calculated by the NFC router.

5. The method of claim 1, comprising:

verifying at least one of the current signature of the routing table and the reference signature using the security module on each initialization of the NFC router.

6. The method of claim 1, comprising:

in response to receiving a further request to provide data from the security module to the NFC router, creating a further signature corresponding to the further request to provide data;

verifying whether the further signature corresponds to the stored reference signature; and providing the requested data from said security module on a gate of said NFC router based on verifying that the further signature corresponds to the stored reference signature.

7. The method of claim 1, comprising:

receiving the personal code keyed in by the authorized user;

verifying the personal code; and updating the routing table is depending on the verification of the personal code.

8. A telecommunication device, comprising:

a security module configured to store data;

a near field communication (NFC) router coupled to the security module, the NFC router having a plurality of individually assignable gates, each individually assignable gate being a physical gate; and a memory configured to store a routing table defining linking assignments of individual ones of the plurality of individually assignable gates of the NFC router, wherein the telecommunication device is configured to:

in response to receiving a request to assign a communication pipe to one of the individually assignable gates, create and store a reference signature for the communication pipe based on at least one of a personal code of an authorized user of the telecommunication device or an identifier of a radio frequency gate of the router;

in response to receiving a request to provide data from the security module to the NFC router, create a current signature corresponding to the request to provide data;

verify whether the current signature corresponds to the stored reference signature; and prevent a provision of the requested data from the security module based on a failure to verify that the current signature corresponds to the stored reference signature.

9. The telecommunication device of claim 8, wherein the telecommunication device is configured to create and store the reference signature for the communication pipe based on the personal code of an authorized user of the telecommunication device.

10. The telecommunication device of claim 8, wherein the security module is further configured to verify whether the current signature corresponds to the stored reference signature by comparing the current signature with the reference signature.

11. The telecommunication device of claim 8, wherein the telecommunication device is further configured to prevent a modification of the routing table absent verification of the personal code entered by a user.

12. The telecommunication device of claim 8, wherein the telecommunication device is further configured to calculate the current signature based on an identifier of the communication pipe, an identifier of a first gate, and an identifier of a second gate, the first and second gates of the NFC router being linked by the communication pipe.

13. A telecommunication device comprising:

a near field communication (NFC) router having a routing table associated therewith, the routing table configured to store assignments of individually assignable gates of the NFC router; and a security module having a memory to store data, the security module configured to prevent transfer of data stored in the security module absent verification of a current signature of the routing table, wherein the verification is a joint operation performed using both the NFC router and the security module, and wherein the device is configured to:

in response to receiving a request to assign a communication pipe to one of the individually assignable gates, create and store a reference signature for the communication pipe based on at least one of a personal code of an authorized user of the telecommunication device or an identifier of a radio frequency gate of the router;

in response to receiving a request to provide data from the security module to the NFC router, create a current signature corresponding to the request to provide data;

verify whether the current signature corresponds to the stored reference signature; and prevent a provision of the requested data from the security module based on a failure to verify that the current signature corresponds to the stored reference signature.

14. The telecommunication device of claim 13, wherein the security module includes:

means for calculating the reference signature on each modification of the routing table; and means for storing the reference signature.

15. The telecommunication device of claim 14, wherein the security module includes:

means for verifying whether the current signature corresponds to the reference signature.

16. The telecommunication device of claim 13, further comprising:

means for preventing a modification of the routing table absent verification of the personal code entered by the user.

17. The telecommunication device of claim 13, further comprising:

means for calculating the current signature based on an identifier of the communication pipe, an identifier of a first gate, and an identifier of a second gate of the NFC router, the first and second gates being linked by the communication pipe.

* * * * *

UNITED STATES PATENT AND TRADEMARK OFFICE

CERTIFICATE OF CORRECTION

PATENT NO. : 10,278,077 B2
APPLICATION NO. : 13/583157
DATED : April 30, 2019
INVENTOR(S) : Thierry Huque et al.

It is certified that error appears in the above-identified patent and that said Letters Patent is hereby corrected as shown below:

On the Title Page

Page 2, Column 2, Line 29 under Item (56) References Cited, Other Publications:
"Smart Cards; UICC-Contactless Front-end (CLF) Interface; Host Interface (HCI) (Release 7); ETSI TS 102 622, ETSI Standard, European Telecommunications Standards Institute (ETSI), Sophia Antipolis Cedex, France, vol. SCP-T, No. V7.4.0, Apr. 1, 2009 (Apr. 1, 2009), XP014043836."
Should read:
--Smart Cards; UICC-Contactless Front-end (CLF) Interface; Host Controller Interface (HCI) (Release 7); ETSI TS 102 622, ETSI Standard, European Telecommunications Standards Institute (ETSI), Sophia Antipolis Cedex, France, vol. SCP-T, No. V7.4.0, Apr. 1, 2009 (Apr. 1, 2009), XP014043836.--.

In the Claims

Column 11, Line 29:
"updating the routing table is depending on the verification"
Should read:
--updating the routing table depending on the verification--.

Signed and Sealed this
Eighteenth Day of June, 2019

Andrei Iancu
*Director of the United States Patent and Trademark Office*